United States Patent
Geddam et al.

(10) Patent No.: US 8,670,893 B2
(45) Date of Patent: Mar. 11, 2014

(54) FRAMEWORK FOR SUPPORTING REPAIR PROCESSES OF AIRCRAFT

(75) Inventors: Veera Venkata Ravi Kumar Geddam, Bangalore (IN); Sambasiva Rao Maddali, Bangalore (IN); Devaraja Holla Vaderahobli, Dakshina Kannada District (IN); Narendhar Rao Soma, Hyderabad (IN); Rajesh Balakrishnan, Bangalore (IN); Venugopal Subbarao, Bangalore (IN); Sandeep Kumar Dewangan, Bangalore (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/369,706

(22) Filed: Feb. 9, 2012

(65) Prior Publication Data

US 2012/0143908 A1    Jun. 7, 2012

Related U.S. Application Data

(62) Division of application No. 12/511,211, filed on Jul. 29, 2009.

(30) Foreign Application Priority Data

Jun. 15, 2009 (IN) .......................... 1401/CHE/2009

(51) Int. Cl.
*G06F 17/30* (2006.01)
*B64F 5/00* (2006.01)

(52) U.S. Cl.
CPC ......... *G06F 17/30292* (2013.01); *B64F 5/0045* (2013.01); *B64F 5/0081* (2013.01)
USPC .......................... 701/29.3; 701/34.2; 707/803

(58) Field of Classification Search
CPC ................................. G06F 17/30292
USPC ................................. 701/29.3, 34.2; 707/803
See application file for complete search history.

(56) References Cited

U.S. PATENT DOCUMENTS

| | | | | |
|---|---|---|---|---|
| 5,023,791 A * | 6/1991 | Herzberg et al. | ............ | 701/33.4 |
| 5,408,412 A * | 4/1995 | Hogg et al. | ................. | 701/33.4 |
| 5,552,984 A * | 9/1996 | Crandall et al. | ............. | 702/183 |
| 5,623,411 A * | 4/1997 | Morvan | ......................... | 701/14 |
| 5,778,381 A * | 7/1998 | Sandifer | ...................... | 701/29.1 |
| 6,067,486 A * | 5/2000 | Aragones et al. | ............ | 701/29.6 |
| 6,141,608 A * | 10/2000 | Rother | ......................... | 701/29.6 |
| 6,278,913 B1 * | 8/2001 | Jiang | ................................. | 701/3 |
| 6,567,729 B2 * | 5/2003 | Betters et al. | ................. | 701/31.5 |
| 6,574,644 B2 * | 6/2003 | Hsu et al. | ...................... | 715/205 |
| 6,615,120 B1 * | 9/2003 | Rother | ......................... | 701/31.8 |
| 6,643,570 B2 * | 11/2003 | Bangert et al. | .............. | 701/32.1 |
| 6,714,846 B2 * | 3/2004 | Trsar et al. | ................... | 701/34.3 |
| 6,829,527 B2 * | 12/2004 | Felke et al. | .................. | 701/29.3 |

(Continued)

*Primary Examiner* — Mark Hellner
*Assistant Examiner* — Ari M Diacou
(74) *Attorney, Agent, or Firm* — Lerner, David, Littenberg, Krumholz & Mentlik, LLP

(57) ABSTRACT

A framework for supporting one or more repair processes of one or more aircraft. The repair processes are based on repair information or repair solution corresponding to the damages to one or more structural components of the aircraft. The framework includes a knowledge engine, and a deployment engine. The knowledge engine automatically generates one or more knowledge interpretation systems based on the user inputs. The knowledge interpretation systems provide the repair information corresponding to the various structural components of the aircraft based on the user inputs. The deployment engine fulfills the deployment requirements corresponding to the one or more knowledge interpretation systems.

15 Claims, 6 Drawing Sheets

(56) References Cited

U.S. PATENT DOCUMENTS

| | | | |
|---|---|---|---|
| 6,845,307 B2* | 1/2005 | Rother | 701/29.6 |
| 6,868,319 B2* | 3/2005 | Kipersztok et al. | 702/185 |
| 7,010,742 B1* | 3/2006 | Hsu et al. | 715/208 |
| 7,209,815 B2* | 4/2007 | Grier et al. | 701/29.1 |
| 7,209,860 B2* | 4/2007 | Trsar et al. | 702/183 |
| 7,260,505 B2* | 8/2007 | Felke et al. | 702/187 |
| 7,721,201 B2* | 5/2010 | Grigoriadis et al. | 715/243 |
| 8,526,971 B2* | 9/2013 | Giniger et al. | 455/456.3 |
| 2001/0049698 A1* | 12/2001 | Hsu et al. | 707/501.1 |
| 2002/0069192 A1* | 6/2002 | Aegerter | 707/1 |
| 2002/0138184 A1* | 9/2002 | Kipersztok et al. | 701/29 |
| 2002/0143443 A1* | 10/2002 | Betters et al. | 701/29 |
| 2004/0034456 A1* | 2/2004 | Felke et al. | 701/29 |
| 2004/0039499 A1* | 2/2004 | Felke et al. | 701/29 |
| 2005/0137762 A1* | 6/2005 | Rother | 701/29 |
| 2005/0289447 A1* | 12/2005 | Hadley et al. | 715/501.1 |
| 2006/0085108 A1* | 4/2006 | Grier et al. | 701/29 |
| 2006/0142908 A1* | 6/2006 | Grier et al. | 701/29 |
| 2006/0142909 A1* | 6/2006 | Grier et al. | 701/29 |
| 2007/0010923 A1* | 1/2007 | Rouyre | 701/29 |
| 2007/0112489 A1* | 5/2007 | Avery et al. | 701/35 |
| 2007/0136663 A1* | 6/2007 | Grigoriadis et al. | 715/530 |
| 2007/0220089 A1* | 9/2007 | Aegerter | 709/203 |
| 2007/0233341 A1* | 10/2007 | Logsdon | 701/29 |
| 2007/0240097 A1* | 10/2007 | Bailleul et al. | 717/104 |
| 2007/0294001 A1* | 12/2007 | Underdal et al. | 701/29 |
| 2008/0288513 A1* | 11/2008 | Bezrukov et al. | 707/100 |
| 2008/0306894 A1* | 12/2008 | Rajkumar et al. | 706/47 |
| 2009/0048730 A1* | 2/2009 | Akkaram et al. | 701/29 |
| 2010/0205192 A1* | 8/2010 | Quadracci et al. | 707/758 |

* cited by examiner

FRAMEWORK FOR SUPPORTING REPAIR PROCESSES OF AIRCRAFT

CROSS-REFERENCE TO RELATED APPLICATIONS

The present application is a divisional of U.S. patent application Ser. No. 12/511,211, filed Jul. 29, 2009, the disclosure of which is incorporated herein by reference.

BACKGROUND OF THE INVENTION

The present invention relates to repair of aircraft. More specifically, it relates to a framework for supporting one or more repair processes of the aircraft.

Aircraft structural components get damaged during their manufacturing and in service. Repair of such damages requires specialized knowledge and expertise. Most of these damages are repaired using Structural Repair Manuals (SRMs) provided by Original Equipment Manufacturers (OEMs) of the structural components. Typically, the SRMs are voluminous documents containing a large amount of information corresponding to the damages and repair of the aircraft structural components. Repair engineers need to study and interpret the information to provide repair solution (s). The study and interpretation of the SRMs is a complex, tedious and time-consuming process. As a result, the airliners incur a huge cost due to the long repair cycle time.

Most OEMs and airliners maintain a database containing their experiences or specialized knowledge on actual damages and repairs performed over a period of time. However, the current repair processes may not utilize the specialized knowledge stored in the database in providing the repair solutions for the damages. Further, the commercial aircraft industry nowadays uses composite materials for various structural components. The damage and repair of the structural components made of composite materials can be more complex than the repair of components made of metallic structures. Furthermore, the composite repair technology is in its initial stages and is still evolving. Thus, the SRMs may not contain an exhaustive list of damage and repair scenarios related to the structural components made of composite materials. Therefore, the repair of composite materials poses several challenges for the airliners, depots, and OEMs. Furthermore, updated versions of the SRMs are released by the OEMs periodically over the lifetime of the aircraft. The updated versions include a new set of guidelines for damage identification and repair instructions that need to be studied again and adapted in practice to identify the repair solutions.

In light of the discussion above, there is a need for a solution for supporting the repair processes to provide fast, effective, reliable, and consistent repair solutions for metallic as well as composite structures. Further, the solution should use the SRMs as well as the previous damage and repair information to provide the repair solutions. Furthermore, the solution should support the different aircraft configurations available in the industry and the various versions of the SRMs.

BRIEF SUMMARY OF TEE INVENTION

The invention provides a framework, method, and computer program product for supporting one or more repair processes of one or more aircraft. The repair processes of the different aircraft are based on repair information corresponding to the aircraft. The repair information is provided by one or more knowledge interpretation systems corresponding to the aircraft. The knowledge interpretation systems provide the repair information corresponding to one or more structural components of the aircraft. The knowledge interpretation systems are automatically generated based on user inputs. Further, deployment requirements corresponding to the knowledge interpretation systems are provided by one or more users. The deployment requirements facilitate deployment of the knowledge interpretation systems based on the user's requirements. The repair information is also provided by one or more query systems corresponding to the one or more aircraft. The systems are automatically generated based on the user inputs. The query systems identify one or more repair solutions from a plurality of repair solutions, containing repair information, corresponding to the various aircraft. Further, deployment requirements corresponding to the query systems are provided by one or more users. The deployment requirements facilitate the deployment of the query systems based on the user's requirements.

The framework, method, and computer program product described above have several advantages. The framework reduces the time spent in the interpretation of SRMs and providing the repair solutions. The framework utilizes the damage and repair history in assisting to devise the repair solutions and thus, provides the repair solutions in less time for damages that may not be mentioned in the SRMs. The invention significantly reduces the structural repair cycle time and provides a structured and automated interpretation of SRM knowledge. Further, the invention provides a comprehensive solution for reducing the dependency on repair technicians or experts and providing consistent repair designs. The framework also supports different aircraft configurations and thus, reduces the cost of development of interpretation system frameworks for the different aircraft configurations. Furthermore, the framework enables the development of knowledge interpretation systems by repair domain experts with no or limited software programming knowledge.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF DRAWINGS

The invention describes a framework, method, and computer program product for supporting one or more repair processes of one or more aircraft. The repair processes are based on repair information corresponding to one or more structural components of the aircraft. Various documents, such as SRMs, corresponding to the structural components are provided by OEMs and airliners. These documents include information such as the structure of the aircraft, the damage and the repair information of the structural components, and the like. These documents and the information included in them are provided as inputs in various formats to the framework by users, such as repair domain experts. The framework thereafter automatically generates one or more knowledge interpretation systems using the inputs. The knowledge interpretation systems interpret the information included in the documents and thus provide the repair information for the various types of damages to the structural components. The framework therefore, enables generation of the knowledge interpretation systems using non-programming techniques such as generating diagrammatic representations of the information included in the documents, and the like. The generation of the knowledge interpretation systems has been explained in detail in conjunction with the following figures. Further, deployment requirements corresponding to the knowledge interpretation systems are provided by the users. The deployment requirements facilitate deployment of the knowledge interpretation systems according to the user's requirements.

Figure 1:
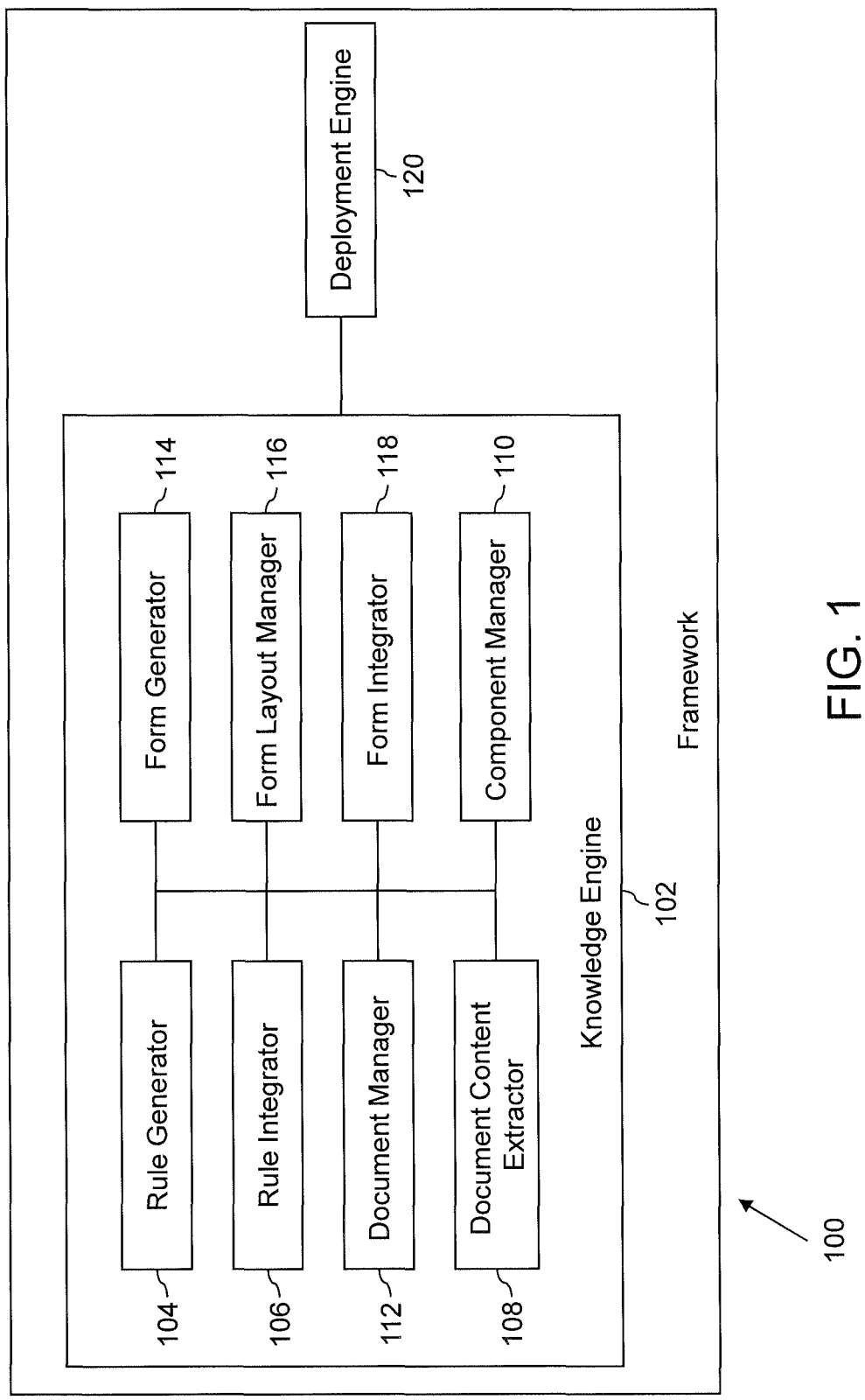
FIG. 1 is a framework for supporting one or more repair processes of one or more aircraft, in accordance with an embodiment of the invention.

FIG. 1 is a framework 100 for supporting one or more repair processes of one or more aircraft, in accordance with an embodiment of the invention. Framework 100 includes a knowledge engine 102 and a deployment engine 120. Knowledge engine 102 includes a rule generator 104, a rule integrator 106, a document content extractor 108, a component manager 110, a document manager 112, a form generator 114, a form layout manager 116, and a form integrator 118.

Knowledge engine 102 automatically generates one or more knowledge interpretation systems based on user inputs. The user inputs required for the generation of a knowledge interpretation system include, information relating to the aircraft such as structure of the aircraft, information relating to the various structural components of the aircraft, and so forth. The knowledge interpretation systems are generated using one or more rules and one or more documents corresponding to the aircraft as explained in conjunction with the following figure(s). A knowledge interpretation system corresponding to an aircraft provides repair information corresponding to one or more structural components of the aircraft. The various structural components of the aircraft may include wings, stabilizers, fuselage, and so forth. It will be evident to a person skilled in the art that a single knowledge interpretation system can provide repair information corresponding to the various structural components of multiple aircraft. The repair information corresponding to the one or more structural components is provided by the knowledge interpretation systems based on the user inputs. The user inputs required for providing the repair information include, description of the structural components, description of the damage, and so forth.

The knowledge interpretation system provides repair information from one or more documents corresponding to the aircraft. The documents may include, but are not limited to, a Structural Repair Manual (SRM), an Aircraft Maintenance Manual (AMM), a Component Maintenance Manual (CMM), and an overhaul and repair manual. The documents corresponding to the aircraft are prepared by the OEMs. These documents include information relating to the different structural components of the aircraft, information relating to the damages and repair of the various structural components, and so forth. A user, for example, a repair engineer, a repair domain expert, knowledge engineer, and the like provides such documents corresponding to the aircraft as an input to knowledge engine 102. Knowledge engine 102 automatically generates the knowledge interpretation systems using the one or more documents. The knowledge interpretation systems automatically interpret the information included in the documents to provide the repair information for the various types of damages. Therefore, knowledge engine 102 enables generation of the knowledge interpretation systems and providing the repair information through non-programming techniques such as providing the documents corresponding to the aircraft as an input to knowledge engine 102, generating diagrammatic representations, such as flowcharts, of the information corresponding to the aircraft, and the like.

Rule generator 104 enables the user to generate one or more rules based on the documents corresponding to the aircraft. The user, for example, a repair engineer, a repair domain expert, an expert repair designer, and so forth, studies the documents corresponding to the aircraft. Thereafter, the user generates different rules corresponding to the aircraft based on the study and interpretation of the information included in the documents. In an embodiment of the invention, rule generator 104 enables the user to modify and re-use the existing rules for the various aircraft. A rule provides repair solution or repair information for a particular type of damage to one or more structural components of the aircraft. The rules are used for the interpretation of the one or more documents by knowledge engine 102 and thus provide the repair information. The user generates various rules corresponding to the different structural components of the aircraft. It will be evident to a person skilled in the art that multiple rules can be generated for a single structural component of an aircraft. The rules generated by rule generator 104 correspond to the damage and repair information of the various structural components of the aircraft. The damage and repair information is obtained from the various documents of the aircraft. The rules are therefore, used for providing repair information or repair solutions for the various types of damages to the structural components of the aircraft.

Figure 2:
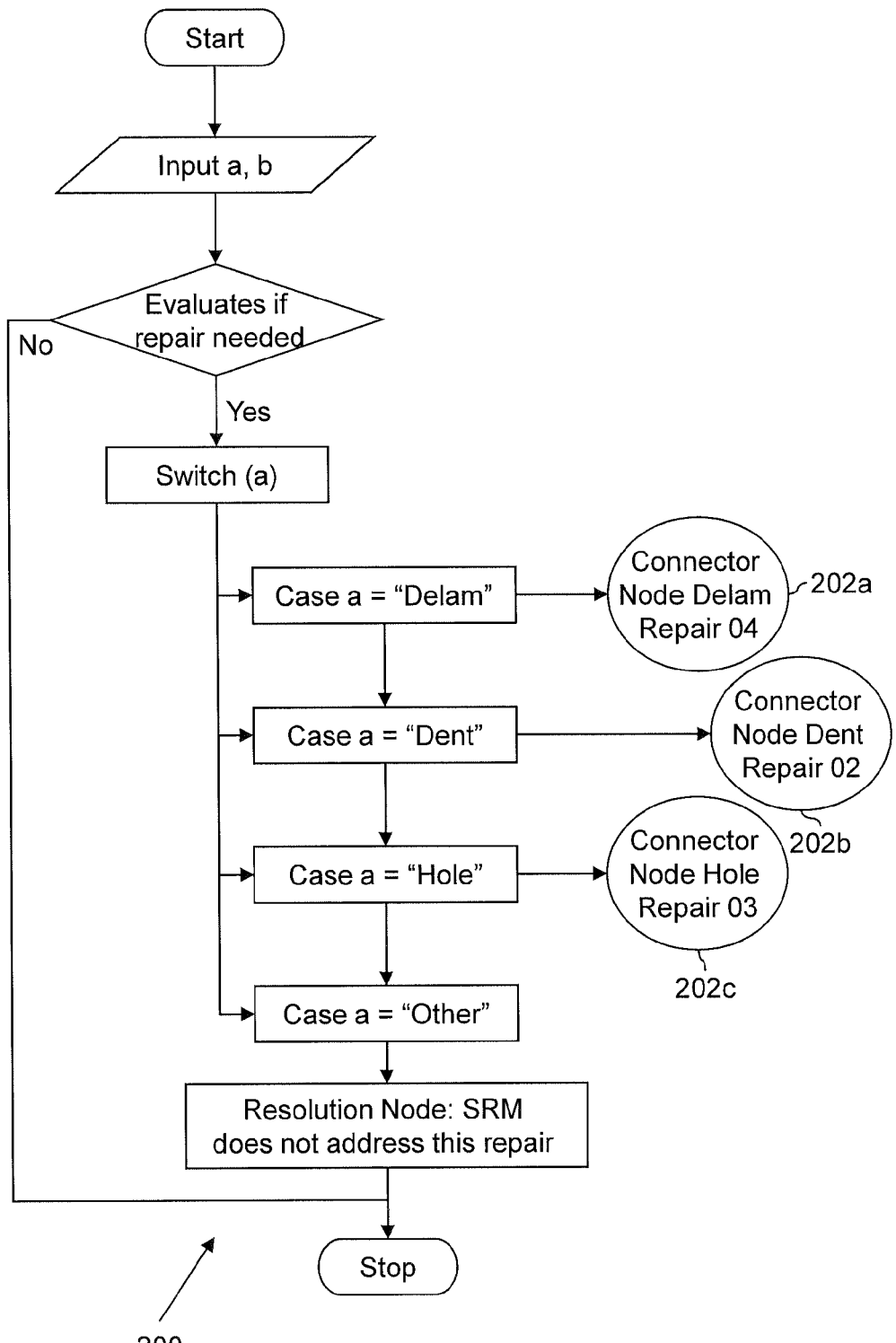
FIG. 2 is a diagrammatic representation of one or more rules corresponding to a structural component of an aircraft, in accordance with an exemplary embodiment of the invention.

The rules may be generated by the user in various formats such as graphics, text, or a combination of both. The different graphical formats for generating the one or more rules may include flowcharts, activity diagrams, and so forth. A flowchart representing a rule corresponding to a particular type of damage provides a logical sequence of steps or activities that need to be performed to repair the damage. In an embodiment of the invention, rule generator 104 facilitates the generation of the rules in the form of flowcharts through a Graphical User Interface (GUI). In another embodiment of the invention, rule generator 104 facilitates modification and reuse of the previously generated flowcharts for different aircraft. The GUI provides a visual editor, which further provides different visual logic constructs to the user for generating the flowcharts. The different visual logic constructs may include decision nodes, resolution nodes, switch nodes, input nodes, terminal nodes, external connector nodes, and so forth. Rule generator 104 may also provide different types of variables, such as Boolean, character, integer, and string in decision flowcharts. The different variables are used for receiving inputs from various users during the execution or use of the knowledge interpretation systems to identify the repair solutions. The inputs are used to gather information such as description of the different structural components of the aircraft, description of the damages to the structural components, and so forth. An exemplary flowchart generated by using the various visual logic constructs is represented in FIG. 2. In an embodiment of the invention, rule generator 104 defines format specifications for the representation of the flowcharts, the visual constructs, and the like, according to Extensible Markup Language (XML) standards. Further, rule generator 104 facilitates storage of input variables during the execution of the knowledge interpretation system. The storage of the input variables facilitates retrieval of historical information corresponding to the damages and repair. The retrieval of the historical information reduces the time spent in providing the repair information. Moreover, the repair information thus provided is reliable and consistent.

Figure 3:
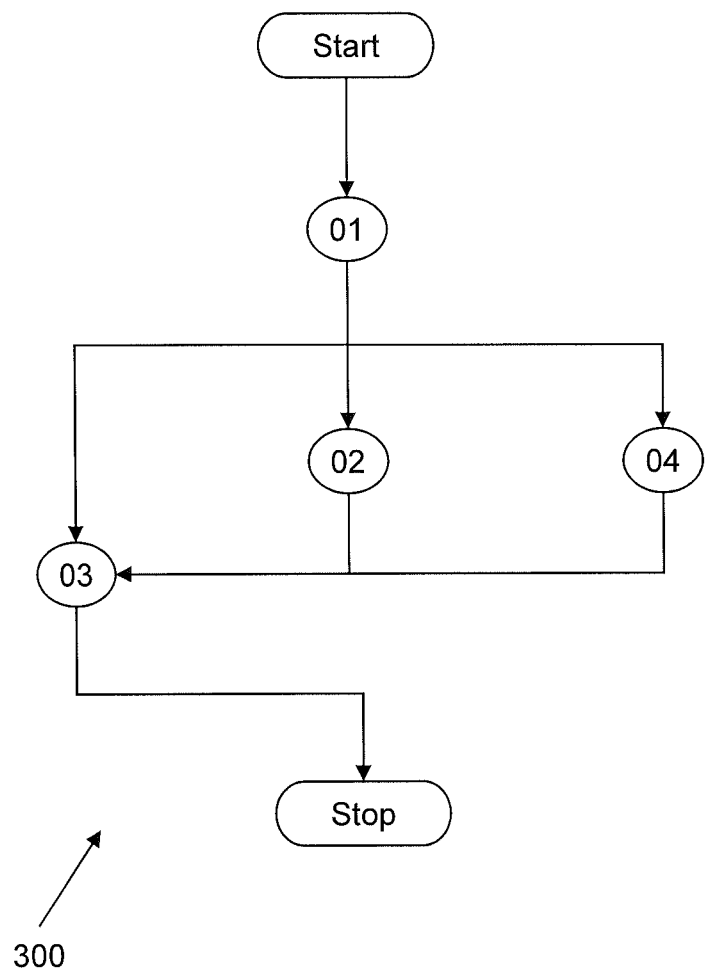
FIG. 3 illustrates diagrammatically a node graph corresponding to the structural component of the aircraft, in accordance with the exemplary embodiment of invention.

Rule integrator 106 enables the user to integrate a set of rules. The integrated set of rules is identified from the one or more rules generated by rule generator 104. A set of rules corresponding to a structural component of the aircraft is integrated by the user using rule integrator 106. The user integrates the various rules corresponding to different types of damages to the structural component of the aircraft. For example, a user integrates the rules corresponding to various damage categories for nose wheel well door component to define the repair procedure for the said aircraft component. The user identifies and integrates the set of rules from the one or more rules based on the study and interpretation of the various documents. The integrated set of rules is used by knowledge engine 102 for the interpretation of the various documents and therefore, provides the repair information. The integration of the set of rules is performed by linking the flowcharts representing the various rules. The linkage between the flowcharts is represented in the flowcharts using various connector nodes as illustrated and explained in conjunction with FIG. 2. The integrated set of rules is represented in various graphical formats such as a node graph, and the like. Each node of the node graph is linked to a flowchart corresponding to a particular type of repair of the structural component. An exemplary node graph corresponding to a structural component of an aircraft is illustrated in FIG. 3. In an embodiment of the invention, rule integrator 106 facilitates modification and re-use of the previously generated node graph representing the integrated set of rules. In another embodiment of the invention, rule integrator 106 facilitates the integration of the rules through a GUI. Rule integrator 106 provides a visual editor for modeling linkages between the flowcharts. Rule integrator 106 also facilitates sharing of the variables and the nodes of the flowcharts through transfer across the defined linkages between the flowcharts. In another embodiment of the invention, rule integrator 106 defines format specifications of node graphs representing the integrated rules according to XML standards. In another embodiment of the invention, the various rules generated in the form of text may be integrated by creating hyperlinks between the rules. The integration of the rules facilitates sharing and reuse of the rules generated for different aircraft.

Document content extractor 108 extracts information from the various documents corresponding to the one or more aircraft. The extraction of the information from the various documents is based on the one or more rules. The rules provide repair solutions or repair information for different damages using the various documents. The information, such as the steps or activities that need to be performed to execute the repair solution, the material required to perform the repair, images or snapshots of the damages, and so forth, may be required for execution of the various rules. The information is stored in the various documents and is extracted by document content extractor 108 based on the one or more rules. In an embodiment of the invention, the various documents may be stored in different formats such as Adobe Portable Document Format (PDF), Microsoft® Word, and so forth. Document content extractor 108 facilitates development of a PDF customization utility to enable the user to tag references in the various documents, such as the SRMs, through Adobe editor component. Further, document content extractor 108 facilitates nested search of the documents by generating a tree of all hyperlinks to different pages of the various documents. The tree is generated from a single hyperlink provided by the user during the generation of the various rules. Document content extractor 108 extracts all pages containing the hyperlinks in the node graph of the integrated set of rules and generates a new Adobe PDF file for future reference.

Component manager 110 stores and manages information corresponding to the one or more structural components of the various aircraft. The information corresponding to a structural component may include, sub-components of the structural component, and so forth. The information corresponding to the structural components is obtained from the various documents corresponding to the aircraft. In an embodiment of the invention, the information corresponding to the various structural components is extracted manually from the documents. The information corresponding to the various structural components is provided by the user, for example, repair engineer, knowledge engineer, and so forth based on the information available in the various documents corresponding to the aircraft. The information corresponding to the structural components may be stored in a graphical format such as a tree structure, and so forth. Component manager 110 facilitates development of a tree to manage the information corresponding to the one or more structural components of the aircraft. In an embodiment of the invention, component manager 110 facilitates modification and re-use of the previously generated trees based on different configurations or models of the aircraft. The tree, also referred to as an aircraft component tree, represents the structural components of a single aircraft. Each leaf node of the aircraft component tree represents a repairable structural component of the aircraft. In an embodiment of the invention, component manager 110 may also define format specification for representation of the aircraft component tree according to the XML standards. Component manager 110 displays the aircraft component tree to the various users of the knowledge interpretation systems to enable them to identify the structure of the aircraft and thereby identify the repair solutions. The aircraft component tree assists the users to navigate to a particular aircraft component. Further, the leaf nodes representing the structural components are linked to the one or more flowcharts of the corresponding structural components. Component manager 110 facilitates creation of hyperlinks between each leaf node of the aircraft component tree and the one or more flowcharts representing the rules. The creation of hyperlinks therefore, assists in the management of the rules and the documents corresponding to the aircraft. Further, the users can execute the rules using their links with the leaf nodes of the aircraft component tree.

Document manager 112 stores and manages the one or more documents and the one or more rules corresponding to the various aircraft. In an embodiment of the invention, the various documents corresponding to the aircraft may be stored in various formats, such as Microsoft® Word, Adobe Portable Document Format, and so forth. Document manager 112 facilitates generation and storage of links, such as hyperlinks, between the rules and the documents corresponding to the aircraft. In an embodiment of the invention, hyperlinks are created between various process or input nodes of the flowcharts (representing the various rules) and the corresponding documents used in the nodes. Document manager 112 therefore, manages the documents and the rules corresponding to the various aircraft. Further, document manager 112 facilitates storage of details, such as name, and path, of the hyperlinked node graphs and the flowcharts associated with the aircraft component tree. Furthermore, document manager 112 facilitates display of warning dialogs during the generation of the various rules. The warning dialogs, such as alerts, highlight incomplete linkages of the visual constructs of the flowcharts to the GUI controls while storing the various rules represented by the flowcharts.

Form generator 114 generates one or more forms corresponding to the various structural components of the aircraft. These forms are used by the knowledge interpretation systems for receiving the user inputs corresponding to the various structural components of the aircraft. The user inputs obtained using the forms may include, description of the structural components of the aircraft, description of the damage to the structural components, and similar details. The user inputs are used for identifying the repair information during the execution of the knowledge interpretation systems. Form generator 114 provides various GUI controls, such as text box, combo list, radio buttons, and so forth, through visual editor for generating the forms. A user, for example, a repair engineer, a knowledge engineer, and so forth, selects the GUI controls for generating the forms. The forms thus generated vary according to different parameters such as user requirements, structure of the aircraft, and so forth. In an embodiment of the invention, form generator 114 facilitates alteration or modification of previously generated forms for various aircraft. In another embodiment of the invention, form generator 114 may also provide a set of form templates to be used for receiving the user inputs. Furthermore, form generator 114 may allow the GUI controls to be hidden or inactive to allow for logic driven dynamic appearance during the execution of the knowledge interpretation systems. Thus, form generator 114 makes provisions for the knowledge interpretation systems to perform context-based rendering of the predefined GUI controls on the various forms for receiving the user inputs.

Form layout manager 116 displays the various forms to the one or more users of the knowledge interpretation systems for receiving the user inputs. Form layout manager 116 may also facilitate grouping of the GUI controls specified through form generator 114 to display them to the users. Form layout manager 116 also provides various group controls or group-frame controls, such as forms, group frames, and so forth, through a visual editor for grouping of the GUI controls.

Form integrator 118 integrates the forms with the various rules. The integration of the forms and the rules assists in the generation of the knowledge interpretation systems. Form integrator 118 binds or links the various GUI controls of the forms with the various nodes of the flowcharts representing the rules. The integration of the forms with the rules is performed based on user requirements. The user requirements provided for the integration include the programming language, the operating systems, and so forth required for operating the knowledge interpretation systems. The integration of the forms with the rules is also based on the control flow as dictated by the various flowcharts and node graphs. Therefore, form generator 118 enables generation of various knowledge interpretation systems for a single aircraft according to the user requirements. Form integrator 118 generates various scripts to integrate the forms and the rules and thus generates the knowledge interpretation systems. Form integrator 118 is the code generation component of knowledge engine 102. In an embodiment of the invention, form integrator 118 enables creation of program source codes, such as Microsoft® C# files, Java files, header files, Java Server Pages (JSPs), servlets, and so forth. Form integrator 118 also assists in creation of build and other infrastructure files such as makefiles, files with extension such as 'jmk', 'idl', 'ant', and so forth. Further, form integrator 118 enables creation of java class files with appropriate path hierarchies according to standard specifications to ensure portability across third-party enterprise server platforms. Furthermore, form integrator 118 enables the user to create Microsoft® .Net assemblies, Meta files, and other necessary binaries and components required in the context of Microsoft® .Net implementation.

Deployment engine 120 caters to deployment requirements corresponding to the one or more knowledge interpretation systems. The deployment requirements are provided by the various users, such as repair design engineers, and so forth. The deployment requirements may include inputs corresponding to build-time and deployment environment, such as operating system, Lightweight Directory Access Protocol (LDAP) servers for authentication, Simple Mail Transfer Protocol (SMTP) servers for mail configuration, data sources definitions for specifying Open Database Connectivity (ODBC), Java Database Connectivity (JDBC) servers, and so forth. Deployment engine 120 assists in establishing compatibility of framework 100 with various platforms, such as Microsoft® Windows, UNIX®, Solaris, Linux®, Hewlett Packard Unix (HPUX), and so forth. Deployment engine 120 provides a visual interface to gather the deployment requirements from the users. The deployment requirements assist in creating and modifying configuration files, and building enterprise application archives, other necessary components, and interfaces to enable deployment of archives and binaries of the knowledge interpretation systems on various networks of OEMs, MROs, and the like. The archives and binaries assist in web deployment of the knowledge interpretation systems. Deployment engine 120 also enables the user to create files in various formats, such as Java Archive (JAR), Enterprise Archive (EAR), Web Application Archive (WAR), Resource Adapter Archive (RAR), and so forth, for the deployment of the knowledge interpretation systems.

FIG. 2 is a diagrammatic representation 200 of one or more rules corresponding to a structural component of an aircraft, in accordance with an exemplary embodiment of the invention. Diagrammatic representation 200 includes a flowchart illustrating various rules corresponding to a nose wheel well door component of the aircraft. The flowchart illustrates various repair solutions for the different types of damages, such as dents, holes, delam and the like, to the nose wheel well door. The flowchart also makes provisions for notifying the users in case the repair solution is not available in the various documents, such as SRMs, corresponding to the aircraft. The flowchart helps the user to define inputs such as region of damage, zone identity of the location, ply type, damage type, and so forth. The inputs are defined in the flowcharts using different variables such as a, b, and so forth, which are further processed to identify the repair solutions. Further, depending on the type of damage such as dent, delam and hole, the flowchart connects to other flow charts that identify specific repair procedures for the specific type of damage. The connection or integration between the various flowcharts is illustrated using various connector nodes 202 such as a connector node 202a, a connector node 202b, and a connector node 202c.

FIG. 3 illustrates diagrammatically a node graph 300 corresponding to the structural component of the aircraft, in accordance with the exemplary embodiment of invention. Node graph 300 illustrates various rules corresponding to the nose wheel well door component of the aircraft. Node graph 300 links or integrates flowcharts illustrating different repair solutions for the nose wheel well door. Node graph 300 links the component repair root flowchart with other flowcharts that deal with specific damage type repair procedures for the nose wheel well door. Node graph 300 is made accessible through hyper-link(s) from a leaf node of the aircraft component tree corresponding to the nose wheel well door.

Figure 4:
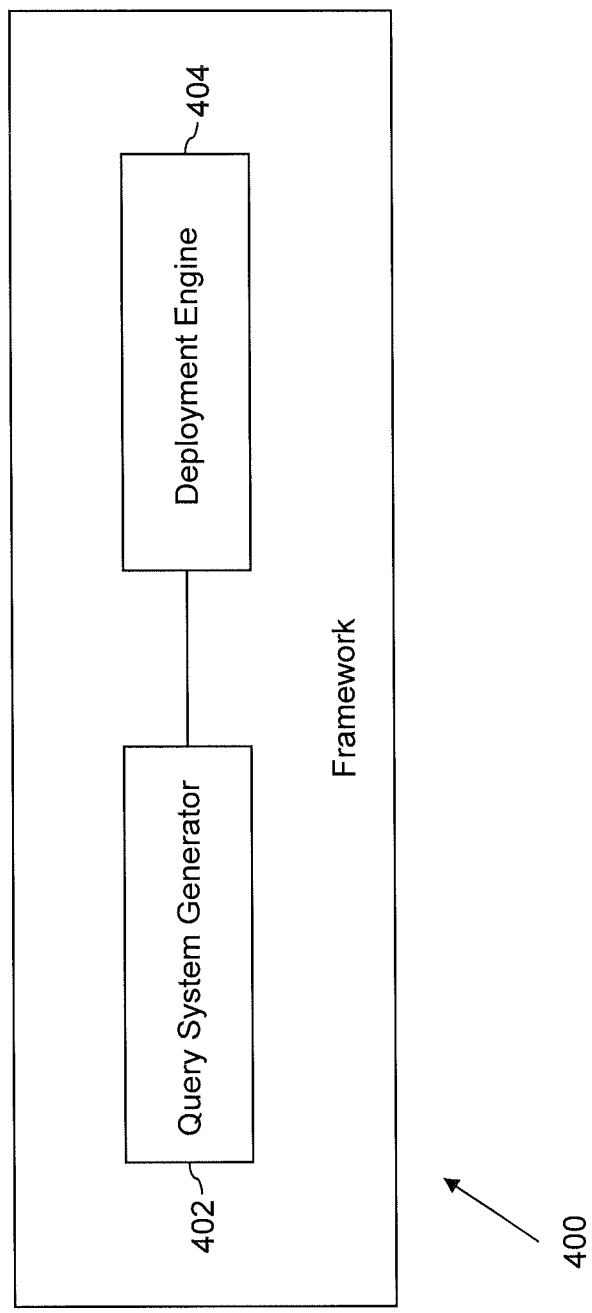
FIG. 4 is a framework for supporting the one or more repair processes of the one or more aircraft, in accordance with another embodiment of the invention.

FIG. 4 is a framework 400 for supporting the one or more repair processes of the one or more aircraft, in accordance with another embodiment of the invention. Framework 400 includes a query system generator 402 and a deployment engine 404.

Query system generator 402 automatically generates one or more query systems based on user inputs. The query systems identify one or more repair solutions from a plurality of repair solutions corresponding to the various aircraft. The repair solutions provide the repair information for repairing the various damages. A query system enables the user, for example, a repair engineer, a knowledge engineer, and so forth, to generate one or more queries to identify the repair solutions. The queries are generated on the basis of one or more features of the one or more structural components of the various aircraft. The various features for generating the various queries may include, shape of the structural component, topological features of the structural component, and so forth. The queries are thus generated based on the user inputs. In other words, the user inputs required for the generation of the query systems correspond to the various features of the structural components of the aircraft.

Query system generator 402 facilitates the creation of native schema templates for the generation of the query systems. The native schema templates are used by the query systems for displaying the queries to the users of the query systems for receiving their inputs. The query systems also use and display existing damage and repair information corresponding to the various aircraft in response to the queries. Therefore, the query systems enable the reuse of the existing damage and repair information. In an embodiment of the invention, query system generator 402 provides a GUI for displaying the native schema templates and the damage and repair information. The GUI provides a visual editor for receiving the user inputs and specifying query constructs. In an embodiment of the invention, query system generator 402 enables modification and creation of tables in the schema templates to create new schema templates. In another embodiment of the invention, query system generator 402 supports one or more different database schema templates such as Microsoft® Excel, Microsoft® Access, and the like. In an embodiment of the invention, query system generator 402 may facilitate auto population of the damage and repair information in the databases. The damage and repair information for different aircrafts is stored by the airliners in different data formats. Query system generator 402 facilitates conversion of the different data formats into some predefined formats and thereby facilitates auto population of the damage and repair information in the databases.

Deployment engine 404 caters to deployment requirements corresponding to the query systems. The deployment requirements are provided by the various users, for example, deployment engineers. The deployment requirements may include inputs corresponding to build-time and deployment environment such as operating system, Lightweight Directory Access Protocol (LDAP) servers for authentication, Simple Mail Transfer Protocol (SMTP) servers for mail configuration, data sources definitions for specifying Open Database Connectivity (ODBC), Java Database Connectivity (JDBC) servers, and so forth. Deployment engine 404 assists in establishing compatibility of framework 400 with various platforms, such as Microsoft® Windows, UNIX®, Solaris, Linux®, Hewlett Packard Unix (HPUX). Deployment engine 404 also provides a visual interface to gather the deployment requirements from the users. The deployment requirements assist in creating and modifying configuration files, and building enterprise application archives, other necessary components, and interfaces to enable deployment of archives and binaries of the query systems on various networks of OEMs, MROs, and the like. The archives and binaries assist in web deployment of the query systems. Deployment engine 404 also enables creation of files in various formats, such as Java Archive (JAR), Enterprise Archive (EAR), Web Application Archive (WAR), Resource Adapter Archive (RAR), and so forth for the deployment of the query systems.

Figure 5:
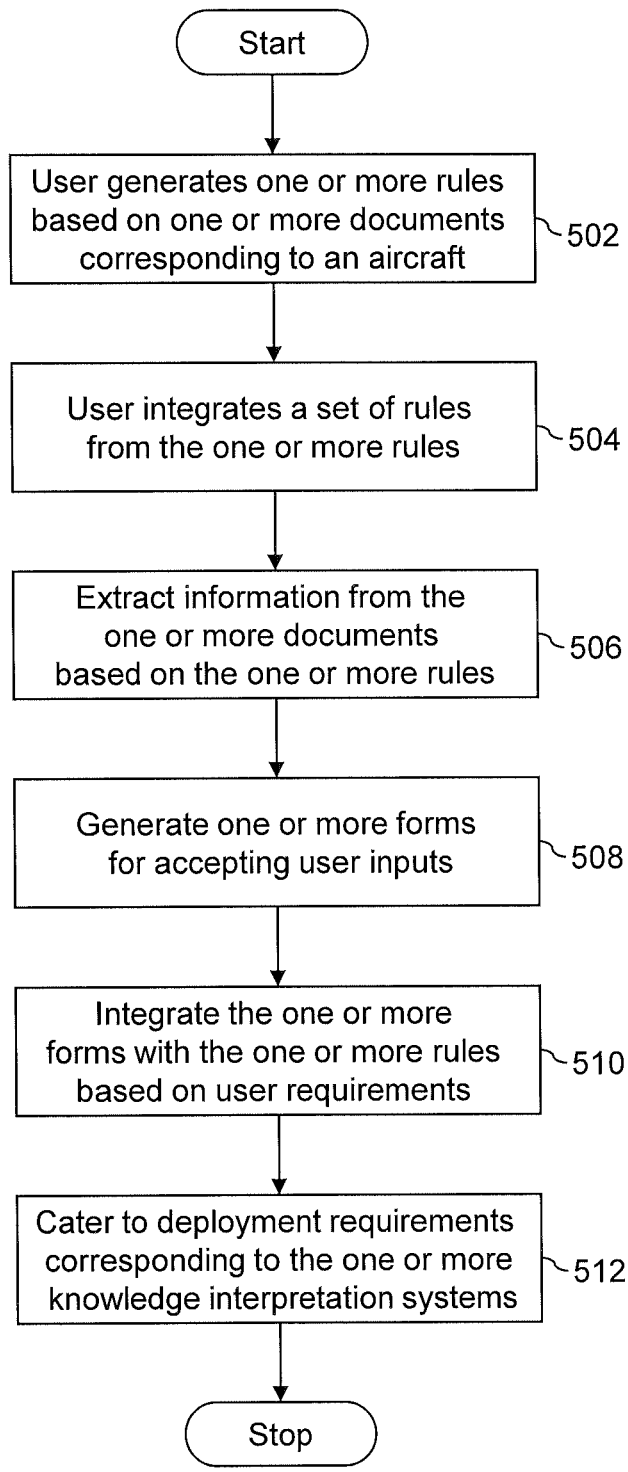
FIG. 5 is a flowchart illustrating a method for supporting one or more repair processes of one or more aircraft, in accordance with an embodiment of the invention.

FIG. 5 is a flowchart illustrating a method for supporting one or more repair processes of one or more aircraft, in accordance with an embodiment of the invention.

The one or more repair processes are based on repair information corresponding to various damages to one or more structural components of the one or more aircraft. The repair information is obtained from one or more knowledge interpretation systems corresponding to the aircraft. The knowledge interpretation systems are automatically generated based on user inputs. The knowledge interpretation systems are used for interpreting one or more documents corresponding to the aircraft to provide the repair information. The user inputs are therefore, based on the various documents corresponding to the aircraft, such as Structural Repair Manuals (SRMs), Aircraft Maintenance Manuals (AMMs), Component Maintenance Manuals (CMMs), and overhaul and repair manuals.

At 502, a user, for example, a repair engineer, a knowledge engineer, a repair domain expert, and so forth, generates one or more rules. The rules are generated on the basis of the various documents corresponding to the aircraft. The rules are used for interpretation of the documents to provide the repair information. The generation of the rules has been explained in detail in conjunction with FIG. 1.

At 504, a user integrates a set of rules. The integrated set of rules may correspond to a structural component of the aircraft. The integrated set of rules is identified from the one or more rules. The user identifies and integrates the set of rules from the one or more rules based on the documents. The integrated set of rules is used for interpreting the documents and thereby providing the repair information.

At 506, information included in the documents is extracted on the basis of the rules. The information extracted from the documents may include, steps or activities that need to be performed to execute a repair solution, materials required to perform the repair, and so forth. Further, at 506, the documents and the rules corresponding to the aircraft are stored and managed. Similarly, at 506, information corresponding to the one or more structural components of the aircraft is stored and managed as explained in conjunction with FIG. 1.

At 508, one or more forms are generated for receiving the user inputs. The user inputs correspond to the various structural components of the aircraft and are used for providing the repair information corresponding to the structural components. The forms are then displayed to the users of the knowledge interpretation systems for receiving their inputs. The forms are displayed to the users through a GUI.

At 510, the forms are integrated using the rules based on user requirements. The integration of the forms and the rules assists in the generation of the knowledge interpretation systems. The user requirements provided for the integration include the programming language, the operating systems, and so forth required for operating the knowledge interpretation systems.

At 512, deployment requirements corresponding to the one or more knowledge interpretation systems are catered or fulfilled. The deployment requirements enable deployment of the knowledge interpretation system on the networks of OEMs, MROs, and the like. The deployment requirements are provided by the users, for example, deployment engineers, Information Technology (IT) engineers, and so forth.

Figure 6:
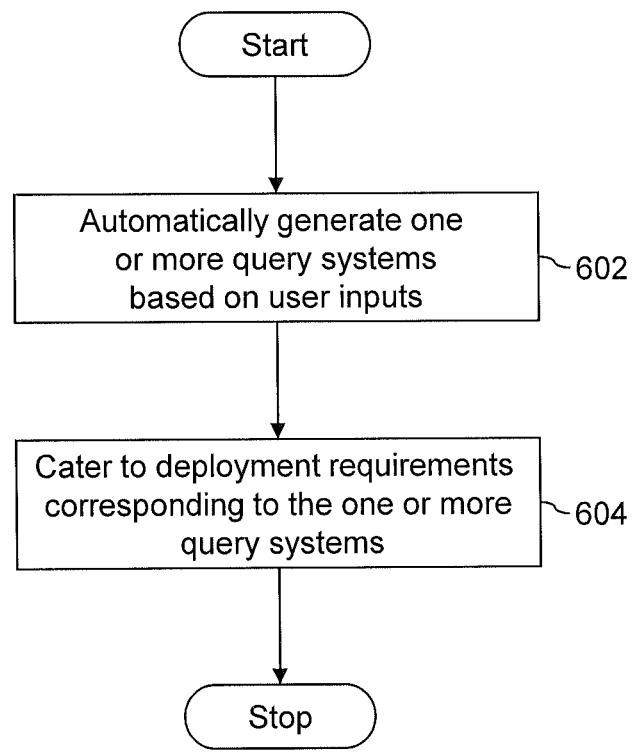
FIG. 6 is a flowchart illustrating the method for supporting the one or more repair processes of the one or more aircraft, in accordance with another embodiment of the invention.

FIG. 6 is a flowchart illustrating a method for supporting the one or more repair processes of the one or more aircraft, in accordance with another embodiment of the invention.

The one or more repair processes are based on one or more repair solutions corresponding to the various damages to the structural components of the aircraft. The repair solutions are obtained from one or more query systems corresponding to the aircraft. The query systems are automatically generated based on user inputs. The query systems are used for identifying the one or more repair solutions from a plurality of repair solutions corresponding to the aircraft.

At 602, the one or more query systems are automatically generated based on the user inputs as explained in detail in conjunction with FIG. 4. The query systems enable the user to generate one or more queries to identify the repair solutions. The queries are generated based on one or more features of the structural components of the aircraft. The features used for generating the various queries may include, shape of the structural components, the topological features of the aircraft, and the like.

At 604, deployment requirements corresponding to the query systems are catered. The deployment requirements enable deployment of the query systems on the networks of the OEMs, MROs, and the like, as explained in conjunction with FIG. 4. The deployment requirements are provided by the users, for example, deployment engineers, IT engineers, and so forth.

The framework, method, and computer program product described above have several advantages. The framework enables automatic generation of various knowledge interpretation systems and various query systems, thereby reducing the time spent in the interpretation of Structural Repair Manuals (SRMs) and providing repair solutions. The framework utilizes the damage and repair history in assisting to devise the repair solutions through the various query systems, and thus provides the repair solutions in less time for damages that may not be mentioned in the SRMs. The invention significantly reduces the structural repair cycle time and provides a structured and automatic interpretation of SRM knowledge. Further, the invention provides a comprehensive solution for reducing the dependency on repair technicians or experts and providing consistent repair designs. The framework also supports different aircraft configurations by enabling automatic generation of the knowledge interpretation systems for the different aircraft configurations or models. Thus, the framework reduces the cost of development of interpretation system frameworks for the different aircraft configurations. Furthermore, the framework enables the development of knowledge interpretation systems by repair domain experts with no or limited software programming knowledge.

The framework for supporting one or more repair processes of one or more aircraft, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for supporting one or more repair processes of one or more aircraft. The computer program product includes a computer usable medium having a set program instructions comprising a program code for supporting one or more repair processes of one or more aircraft. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention, as described in the claims.

The invention claimed is:

1. A framework for supporting one or more repair processes of one or more aircrafts, the framework comprising:
 a. a query system generator in communication with a microcontroller configured to:
  receive user inputs pertaining to one or more structural components of the one or more aircrafts via a user interface,
  auto populate one or more databases with information on damage and repair of the one or more structural components,
  create and customize one or more schema templates based on the user inputs and the information in the one or more databases, and generate one or more query systems using the one or more schema templates; and b. a deployment engine in communication with the micro-controller configured to:

receive deployment requirements corresponding to the one or more query systems, wherein the deployment requirements are provided by one or more deployment users, and deploy the one or more query systems on one or more networks.

2. The framework of claim 1, wherein the one or more query systems are accessed by the users of the query system to generate one or more queries and obtain responses to the one or more queries based on the information in the one or more databases for identifying one or more repair solutions.

3. The framework of claim 2, wherein the one or more queries are generated based on shape and topological features of the one or more structural components of the one or more aircrafts.

4. A method for supporting one or more repair processes of one or more aircraft, the method comprising:

receiving user inputs pertaining to one or more structural components of the one or more aircrafts via a user interface by a query system generator in communication with a micro-controller;

auto-populating information on damage and repair of the one or more structural components of the one or more aircrafts in one or more databases by the micro-controller;

creating and customizing one or more schema templates, based on the user inputs and the information in the one or more databases, and using the one or more schema templates for automatically generating one or more query systems by the query system generator;

receiving deployment requirements corresponding to the one or more query systems by a deployment engine in communication with the microcontroller, wherein the deployment requirements are provided by one or more deployment users via the user interface; and deploying the automatically generated one or more query systems on one or more networks by using the deployment engine.

5. The method of claim 4, wherein the one or more query systems are accessed by the users of the query systems to generate one or more queries and obtain responses to the one or more queries based on the information in the one or more databases for identifying the one or more repair solutions.

6. The method of claim 5, wherein the one or more queries are generated based on shape and topological features of the one or more structural components of the one or more aircrafts.

7. A computer program product for use with a computer, the computer program product comprising a non-transitory computer usable medium having a computer readable program code embodied therein for supporting one or more repair processes of one or more aircraft, the computer readable program code performing:

receiving user inputs pertaining to one or more structural components of the one or more aircrafts via a user interface;

auto-populating information on damage and repair of the one or more structural components of the one or more aircrafts in one or more databases, the existing information being maintained by the one or more aircrafts in different data formats;

converting the information in different data formats into a predefined format before auto populating the information in the one or more databases;

creating and customizing one or more schema templates via the user interface based on the user inputs and the information in the one or more databases;

using the one or more schema templates for automatically generating one or more query systems;

receiving deployment requirements corresponding to the one or more query systems wherein the deployment requirements are provided by one or more deployment users via the user interface; and deploying the automatically generated one or more query systems on one or more networks.

8. The framework of claim 1, wherein the query system generator is accessed by the users of the query system generator to modify and create tables in the schema templates to create new schema templates.

9. The framework of claim 1, wherein information on damage and repair exists in different formats with one or more aircrafts.

10. The framework of claim 9, wherein information in different data formats are converted into a predefined format before being auto populated in the one or more databases.

11. The framework of claim 1, wherein the deployment requirements include inputs corresponding to build-time and deployment environment such as operating systems, Lightweight Directory Access Protocol (LDAP) servers for authentication, Simple Mail Transfer Protocol (SMTP) servers for mail configuration, data sources definitions for specifying Open Database Connectivity (ODBC), and Java Database Connectivity (JDBC) servers.

12. The method of claim 4, wherein the query system generator is accessed by one or more users to create and modify tables in the schema templates to create new schema templates.

13. The method of claim 4, wherein information on damage and repair exists in different formats with one or more aircrafts.

14. The method of claim 13, wherein information in different data formats are converted into a predefined format before being auto populated in the one or more databases.

15. The method of claim 4, wherein the deployment requirements include inputs corresponding to build-time and deployment environment such as operating systems, Lightweight Directory Access Protocol (LDAP) servers for authentication, Simple Mail Transfer Protocol (SMTP) servers for mail configuration, data sources definitions for specifying Open Database Connectivity (ODBC), and Java Database Connectivity (JDBC) servers.

* * * * *